US010007262B1

(12) United States Patent
Schwindt

(10) Patent No.: US 10,007,262 B1
(45) Date of Patent: Jun. 26, 2018

(54) SYSTEM FOR MONITORING UNDERNEATH AN AUTONOMOUS VEHICLE

(71) Applicant: Robert Bosch GmbH, Stuttgart (DE)

(72) Inventor: Oliver Schwindt, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/392,478

(22) Filed: Dec. 28, 2016

(51) Int. Cl.
| G05D 1/00 | (2006.01) |
| G07C 5/00 | (2006.01) |
| B60K 35/00 | (2006.01) |
| G06K 9/62 | (2006.01) |

(52) U.S. Cl.
CPC ........... *G05D 1/0055* (2013.01); *B60K 35/00* (2013.01); *G05D 1/0061* (2013.01); *G06K 9/6215* (2013.01); *G07C 5/008* (2013.01)

(58) Field of Classification Search
None
See application file for complete search history.

(56) References Cited

U.S. PATENT DOCUMENTS

| 6,861,972 B2 | 3/2005 | Britton et al. |
| 6,990,253 B2 | 1/2006 | Takeda et al. |
| 8,473,173 B1 | 6/2013 | Robles |
| 2005/0253694 A1 | 11/2005 | Kuznarawis |
| 2013/0128048 A1* | 5/2013 | Okajima ............... B60R 1/00 348/148 |
| 2014/0049405 A1* | 2/2014 | Breuer ................. B60Q 9/00 340/905 |
| 2014/0300740 A1 | 10/2014 | Fujioka |
| 2015/0198951 A1 | 7/2015 | Thor et al. |
| 2016/0101734 A1* | 4/2016 | Baek .................... B60R 1/00 348/148 |
| 2016/0257248 A1 | 9/2016 | Lisseman et al. |

FOREIGN PATENT DOCUMENTS

EP 2441330 A2 4/2012

\* cited by examiner

*Primary Examiner* — Lail A Kleinman
(74) *Attorney, Agent, or Firm* — Michael Best & Friedrich LLP

(57) ABSTRACT

A method and system for monitoring an area underneath an autonomous vehicle. The method includes capturing a first topography of a ground surface underneath the autonomous vehicle with a sensor when the autonomous vehicle is stationary; storing the topography of the ground surface in a memory prior to the autonomous vehicle being switched off; capturing a second topography of the ground surface underneath the autonomous vehicle with the sensor before the autonomous vehicle begins moving; and comparing, with an electronic processor, the first topography with the second topography. The method includes enabling autonomous driving of the autonomous vehicle when the first topography of the ground surface underneath the autonomous vehicle and the second topography of the ground surface underneath the autonomous vehicle match.

16 Claims, 3 Drawing Sheets

SYSTEM FOR MONITORING UNDERNEATH AN AUTONOMOUS VEHICLE

BACKGROUND

Autonomous vehicles include external sensors that monitor the surroundings of the vehicle. When objects are detected by the sensors, control systems within the autonomous vehicle may provide automated maneuvering, stopping, and steering functions. However, external sensors are limited in their field of view and typically do not detect objects underneath the autonomous vehicle. In addition, these systems may demand a high level of system resources and processing time for detecting and tracking objects.

SUMMARY

One embodiment provides a method of monitoring an area underneath an autonomous vehicle. The method includes capturing a first topography of a ground surface underneath the autonomous vehicle with a sensor when the autonomous vehicle is stationary; storing the topography of the ground surface in a memory prior to the autonomous vehicle being switched off; capturing a second topography of the ground surface underneath the autonomous vehicle with the sensor before the autonomous vehicle begins moving; and comparing, with an electronic processor, the first topography with the second topography. The method includes enabling autonomous driving of the autonomous vehicle when the first topography of the ground surface underneath the autonomous vehicle and the second topography of the ground surface underneath the autonomous vehicle match.

Another embodiment provides a system for monitoring an area underneath an autonomous vehicle. The system includes a sensor with a field of view that extends underneath the autonomous vehicle, an input/output interface configured to communicatively connect to a notification device, and an electronic processor communicatively connected to the sensor and the input/output interface. The electronic processor is configured to capture a first topography of a ground surface underneath the autonomous vehicle with a sensor when the autonomous vehicle is stationary, store the topography of the ground surface in the memory of the electronic control unit prior to the autonomous vehicle being switched off, and capture a second topography of the ground surface underneath the autonomous vehicle with the sensor when the autonomous vehicle is switched on. The electronic processor is also configured to compare the first topography with the second topography and enable autonomous driving of the autonomous vehicle when the first topography and the second topography match.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
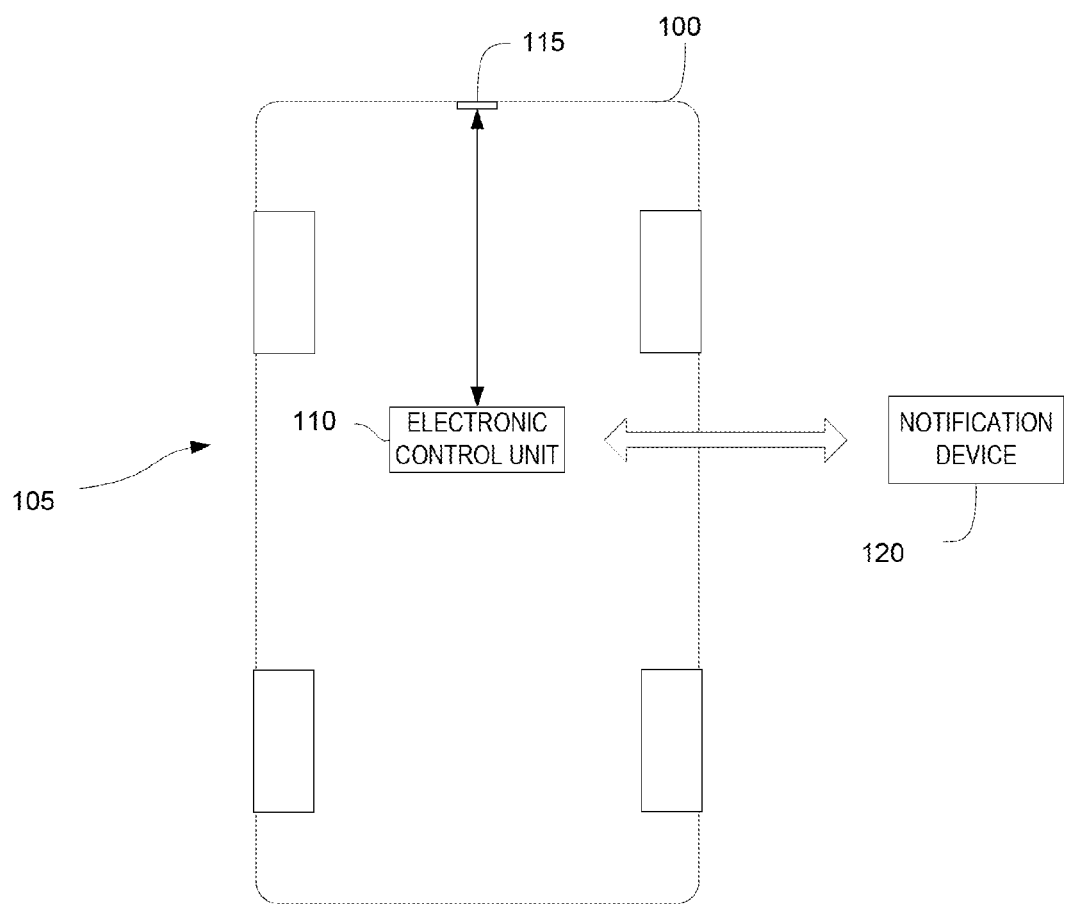
FIG. 1 is a block diagram of an autonomous vehicle equipped with a system for monitoring an area underneath the autonomous vehicle according to one embodiment.

FIG. 1 illustrates an autonomous vehicle 100 equipped with a monitoring system 105 for monitoring an area underneath the autonomous vehicle 100 according to one embodiment. The autonomous vehicle 100, although illustrated as a four-wheeled vehicle, encompasses various types and designs. For example, the autonomous vehicle 100 may include an automobile, a motorcycle, a truck, a bus, a semi-tractor, and others. In the example illustrated, the monitoring system 105 includes an electronic control unit (ECU) 110, a sensor 115 (for example, radar, lidar, ultrasound, infrared, and others), and a notification device 120 (described in greater detail below).

The electronic control unit 110 is communicatively connected to the sensor 115 and the notification device 120. The electronic control unit 110 may be configured to communicate with the sensor 115 and the notification device 120 via various mechanisms or protocols. For example, the electronic control unit 110 and the sensor 115 may be directly wired, wired through a communication bus, or wirelessly connected (for example, via a wireless network). The electronic control unit 110 and the notification device 120 may be connected via similar connections as those listed above or may be connected via a wide area network (for example, the internet), a cellular network, or others. As discussed below, the electronic control unit 110 is configured to receive information from the sensor 115 regarding the surroundings of the autonomous vehicle 100 and to generate notifications to send to the notification device 120.

The notification device 120 may be of various different types and use various different technologies. In one example, the notification device 120 is mounted within the autonomous vehicle 100 and viewable by a user of the autonomous vehicle 100 (for example, mounted on the console, mounted within a seatback, mounted on the roof, etc.). In this case, the notification device 120 may include a display screen, a speaker, or other mechanism for creating an audial, visual, or haptic notification to the user. In other examples, the notification device 120 may be separate from the vehicle 100, have other functionalities, and be configured to communicate with the electronic control unit 110. For example, the notification device 120 may be a portable communication device of a user of the autonomous vehicle 100. In yet another example, the notification device 120 may be a computer terminal positioned at a remote monitoring service that controls, coordinates, or monitors performance of the autonomous vehicle 100. In some embodiments, the notification device 120 includes an input mechanism for receiving a message from a user (for example, an "all-clear" message) and may be configured to send the message back to the electronic control unit 110 of the autonomous vehicle 100.

Figure 2:
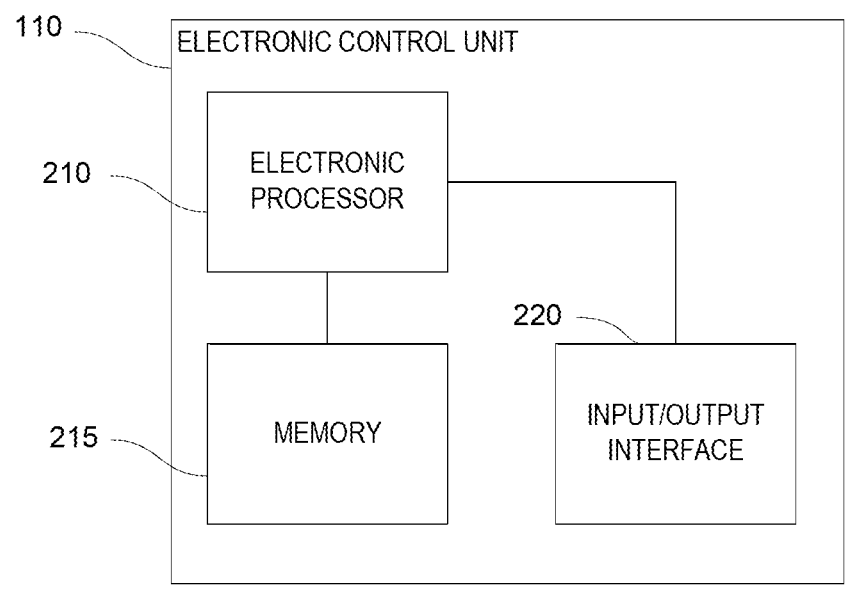
FIG. 2 is a block diagram of an electronic control unit of the system of FIG. 1 according to one embodiment.

FIG. 2 is a block diagram of an electronic control unit 110 of the monitoring system 105 according to one embodiment. The electronic control unit 110 includes a plurality of electrical and electronic components that provide power, operational control, and protection to the components and modules within the electronic control unit 110. The electronic control unit 110 includes, among other things, an electronic processor 210 (such as a programmable electronic microprocessor, microcontroller, or similar device), a memory 215, and an input/output interface 220. The term "memory 215" includes any type of non-transitory, machine-readable memory including various types of non-volatile memory. The memory 215 may include internal and external memory, hard drives, disks, and others. In some embodiments, the electronic control unit 110 includes additional, fewer, or different components. For example, the electronic control unit 110 may be implemented in several independent electronic control units or modules each configured to perform specific steps or functions of the electronic control unit 110.

The electronic processor 210, in coordination with the memory 215, the input/output interface 220, and other components of the electronic control unit 110, is configured to perform the processes and methods discussed herein. For example, the electronic processor 210 is configured to retrieve from memory 215 and execute, among other things, instructions related to receiving sensor data from the sensor 115, generating notifications for the notification device 120, and enabling/disabling autonomous control of the autonomous vehicle 100. The input/output interface 220 is configured to perform input/output functions for the electronic processor 210. For example, the input/output interface 220 is configured to communicate with the sensor 115 and the notification device 120.

Figure 3:
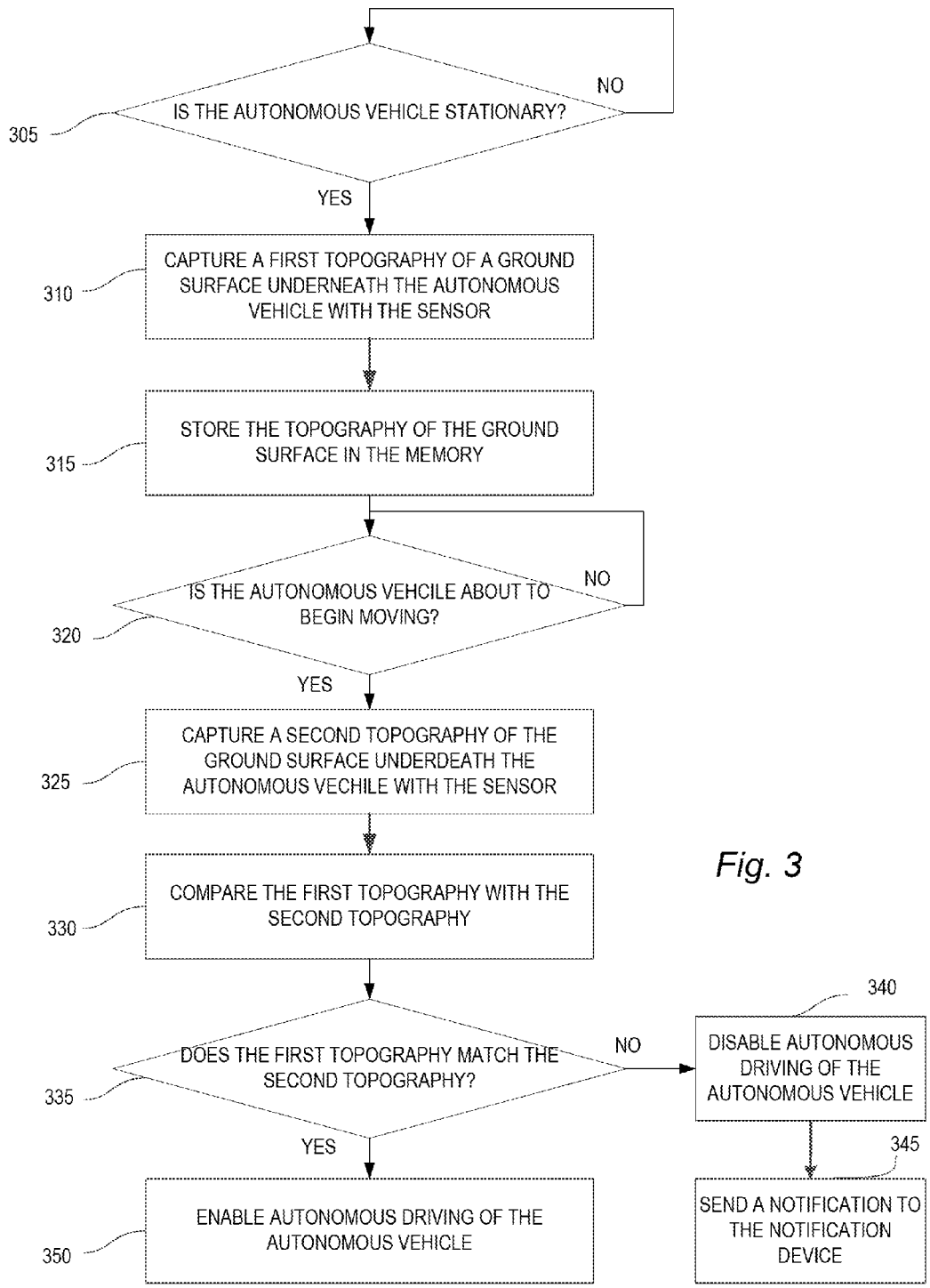
FIG. 3 is a flowchart of a method of operating the autonomous vehicle of FIG. 1 according to one embodiment.

FIG. 3 is a flowchart of a method of operating the autonomous vehicle 100 according to one embodiment. In the illustrated method, the electronic processor 210 first determines whether the autonomous vehicle is "stationary" (block 305). This may include determining whether the autonomous vehicle is in a state of any of the following conditions: parked, stopped, or shutting down. These conditions may be determined based on various operational parameters of the autonomous vehicle 100 including a location of the autonomous vehicle 100, an amount of time that the autonomous vehicle 100 is not moving, arrival at a predetermined destination, and others. In some embodiments, the determination of being "stationary" only occurs under one of the particular conditions. For example, in some embodiments, the electronic processor 210 sets a flag indicating that the autonomous vehicle is "stationary" only when the autonomous vehicle 100 is parked (for example, in the parked gear). In other embodiments, the electronic processor 210 sets a flag indicating that the autonomous vehicle 210 is "stationary" only when the autonomous vehicle 100 is not moving (for example, stopped) for more than a particular period of time. In yet other embodiments, the electronic processor 210 sets a flag indicating that the autonomous vehicle 100 is "stationary" only when the autonomous vehicle 100 is in the process of turning off (for example, in a power down sequence).

When the electronic processor 210 determines that the autonomous vehicle 100 is stationary, the electronic processor 210 captures a first topography of a ground surface underneath the autonomous vehicle 100 with the sensor 115 (block 310). The topography may be obtained by scanning the ground surface with the sensor 115. For example, the sensor 115 may sense the distance to various points of the ground surface using a series of radio frequency reflections and create a topographical map based on the reflections. In some embodiments, the sensor 115 includes a lidar scanner or high resolution radar scanner that senses the elevation of the autonomous vehicle 100 at multiple points underneath the autonomous vehicle 100. In some embodiments, the sensor 115 includes an ultrasonic sensor, and the electronic processor 210 determines a distance to the ground at various points underneath the autonomous vehicle 100 using ultrasonic waves. In these embodiments, the electronic processor 210 may create a topological map based on ultrasonic reflections received by the ultrasonic sensor. In other embodiments, the sensor 115 includes an infra-red camera, and the electronic processor 210 detects temperature variations underneath the autonomous vehicle 100. The temperature variations may indicate the presence of living objects underneath the autonomous vehicle 100. In other embodiments, the sensor 115 may also scan the ground surface around the perimeter of the autonomous vehicle 100 and include the ground surface around the perimeter in the topographic map. The electronic processor 210 then stores the topography of the ground surface in the memory 215 (block 315).

The electronic processor 210 determines whether the autonomous vehicle 100 is about to begin moving (block 320). In some embodiments, this includes determining when the autonomous vehicle 100 is switched back on (for example, the vehicle's engine is turned on). In other embodiments, this includes determining whether the autonomous vehicle 100 is switching into a drive gear or other indication that the autonomous vehicle 100 is about to move. For example, in some embodiments, another vehicle controller in the autonomous vehicle 100 sends a signal to the electronic processor 210 that indicates that the autonomous vehicle 100 is about to move. Before the autonomous vehicle 100 begins moving, the electronic processor 210 captures a second topography of the ground surface underneath the autonomous vehicle 100 (block 325). The second topography may be captured by using the same technique or different technique used in capturing the first topography.

The electronic processor 210 then compares the first topography with the second topography (block 330). This may include determining one or more differences between the topographies. For example, the electronic processor 210 may overlay the first topography on the second topography and identify which regions or points in the topographies are not the same. In this way, the electronic processor 210 determines whether the first topography matches the second topography (block 335). In some embodiments, the electronic processor 210 determines whether the differences exceed a predetermined threshold. In this case, the electronic processor 210 flags the topographies as different when the differences exceed the threshold. In some embodiments, the electronic processor 210 determines a difference score indicative of an amount of differences detected between the first topography and the second topography. In this case, the electronic processor 210 determines whether the difference score exceeds a predetermined threshold.

When the first topography does not match the second topography, the electronic processor 210 disables autonomous driving of the autonomous vehicle 210 (block 340). In some embodiments, the electronic processor 210 disables autonomous driving only when the difference score is less than the threshold. In addition, the electronic processor 210 may also send a notification to the notification device 120 indicating that autonomous driving is disabled (block 345). In some embodiments, the notification includes a prompt to check under the autonomous vehicle 100 for the presence of objects. Conversely, when the first topography matches the second topography, the electronic processor 210 enables autonomous driving of the autonomous vehicle 100 (block 350). In some embodiments, if autonomous driving has previously been disabled by the electronic processor 210 based on differences in the topographies, the electronic processor 210 re-enables autonomous driving when the topographies match. Once autonomous driving is disabled, the electronic processor 210 may continue to perform the method 300. In this case, if the topographies match upon a subsequent iteration of the method 300, the electronic processor 210 may then enable autonomous driving.

In some embodiments, however, when the topographies do not match, the electronic processor 210 may wait for an "all-clear" signal before enabling autonomous driving. For example, a passenger of the autonomous vehicle 100 may receive the notification that autonomous driving has been disabled (see block 345). As stated above, the notification may include a prompt to check under the autonomous vehicle 100 for the presence of objects. The passenger may then input a selection on the notification device 120 or another input mechanism indicating that the autonomous vehicle 100 is clear of objects. For example, the passenger may check under the autonomous vehicle 100 and determine that an object is present, but does not pose a hazard to the autonomous vehicle 100 or to the object itself. This prevents the autonomous vehicle 100 from running over a person, a pet, a foot, etc. . . . The notification device 120 then sends the all-clear signal to the electronic processor 210 based on the input from the passenger.

In another embodiment, the electronic processor 210 may be configured to receive an all-clear signal from an external source such as a monitoring service for the autonomous vehicle 100. For example, in one example, the sensor 115 includes a camera that is configured to capture a picture or video of the area underneath the autonomous vehicle 100. The electronic processor 210 may transmit the picture or video to the monitoring service for inspection. When the picture or video is free of objects, the electronic processor 210 may receive an all-clear signal from the monitoring service.

When an all-clear signal is received, the electronic processor 210 may re-enable autonomous driving of the autonomous vehicle 100. Once the autonomous vehicle 100 resumes motion, the electronic processor 210 may reset and restart the method for the next time that the autonomous vehicle 100 is stationary.

Various features, advantages, and embodiments are set forth in the following claims.

What is claimed is:

1. A method of monitoring an area underneath an autonomous vehicle, the method comprising:
    capturing a first topography of a ground surface underneath the autonomous vehicle with a sensor when the autonomous vehicle is stationary;
    storing the first topography of the ground surface in a memory prior to the autonomous vehicle being switched off;
    capturing a second topography of the ground surface underneath the autonomous vehicle with the sensor before the autonomous vehicle begins moving;
    comparing, with an electronic processor, the first topography and the second topography;
    enabling autonomous driving of the autonomous vehicle when the first topography of the ground surface underneath the autonomous vehicle and the second topography of the ground surface underneath the autonomous vehicle match.

2. The method according to claim 1, the method further comprising when the first topography of the ground surface underneath the autonomous vehicle and the second topography of the ground surface underneath the autonomous vehicle are different, disabling autonomous driving of the autonomous vehicle.

3. The method according to claim 1, the method further comprising when the first topography of the ground surface underneath the autonomous vehicle and the second topography of the ground surface underneath the autonomous vehicle are different, generating a notification that autonomous driving is disabled.

4. The method according to claim 3, wherein generating the notification that autonomous driving is disabled includes sending the notification to at least one selected from a group consisting of a user of the autonomous vehicle and a remote monitoring service for the autonomous vehicle.

5. The method according to claim 3, wherein generating the notification that autonomous driving is disabled includes generating a message to check underneath the autonomous vehicle for an object.

6. The method according to claim 1, the method further comprising
    receiving, at the electronic processor, a signal indicating that the autonomous vehicle is clear of the object; and
    enabling autonomous driving of the autonomous vehicle when the signal indicating that the autonomous vehicle is clear of the object is received.

7. The method according to claim 1, wherein comparing, by the electronic processor, the first topography with the second topography includes determining a difference score indicative of an amount of differences detected between the first topography and the second topography.

8. The method according to claim 7, wherein comparing, by the electronic control unit, the first topography with the second topography includes comparing the difference score to a threshold, and wherein enabling autonomous driving of the autonomous vehicle occurs when the difference score is less than the threshold.

9. A system for monitoring an area underneath an autonomous vehicle, the system comprising:
    a sensor with a field of view that extends underneath the autonomous vehicle;
    an input/output interface configured to communicatively connect to a notification device; and
    an electronic control unit with an electronic processor and a memory communicatively connected to the sensor and the input/output interface, the electronic control unit configured to
    capture a first topography of a ground surface underneath the autonomous vehicle with a sensor when the autonomous vehicle is stationary, store the topography of the ground surface in the memory of the electronic control unit prior to the autonomous vehicle being switched off, capture a second topography of the ground surface underneath the autonomous vehicle with the sensor when the autonomous vehicle is switched on, compare the first topography of the ground surface underneath the autonomous vehicle with the second topography of the ground surface underneath the autonomous vehicle, and enable autonomous driving of the autonomous vehicle when the first topography and the second topography match.

10. The system according to claim 9, wherein the electronic control unit is further configured to disable autonomous driving of the autonomous vehicle when the first topography and the second topography are different.

11. The system according to claim 9, wherein the electronic control unit is further configured to generate an indication that autonomous driving is disabled when the first topography and the second topography are different.

12. The system according to claim 11, wherein the electronic control unit is further configured to send the indication to at least one selected from a group consisting of a user of the autonomous vehicle and a remote monitoring service for the autonomous vehicle.

13. The system according to claim 11, wherein the electronic control unit is further configured to generate a message to check underneath the autonomous vehicle for an object.

14. The system according to claim 10, wherein the electronic control unit is further configured to
receive a signal indicating that the autonomous vehicle is clear of the object; and
enable autonomous driving of the autonomous vehicle when the signal indicating that the autonomous vehicle is clear of the object is received.

15. The system according to claim 11, wherein the electronic control unit is further configured to determine a difference score indicative of an amount of differences detected between the first topography and the second topography.

16. The system according to claim 15, wherein the electronic control unit is further configured to compare the difference score to a threshold, and enable autonomous driving of the autonomous vehicle occurs when the difference score is less than the threshold.

* * * * *